United States Patent
Ueki et al.

(10) Patent No.: US 6,912,055 B2
(45) Date of Patent: Jun. 28, 2005

(54) SPHERICAL FORM MEASURING AND ANALYZING METHOD

(75) Inventors: Nobuaki Ueki, Saitama (JP); Hideo Kanda, Saitama (JP)

(73) Assignee: Fujinon Corporation, Saitama (JP)

( * ) Notice: Subject to any disclaimer, the term of this patent is extended or adjusted under 35 U.S.C. 154(b) by 293 days.

(21) Appl. No.: 10/387,562

(22) Filed: Mar. 14, 2003

(65) Prior Publication Data

US 2003/0184763 A1 Oct. 2, 2003

(30) Foreign Application Priority Data

Mar. 29, 2002 (JP) .................................. 2002-093772

(51) Int. Cl.$^7$ ................................................ G01B 9/02
(52) U.S. Cl. ..................................................... 356/511
(58) Field of Search ........................... 356/511, 512, 356/513, 514, 515, 516, 489, 495

(56) References Cited

U.S. PATENT DOCUMENTS

| | | | | |
|---|---|---|---|---|
| 3,785,262 A | * | 1/1974 | Stroke ......................... | 396/333 |
| 5,341,312 A | * | 8/1994 | Lisson et al. ................ | 359/223 |
| 5,343,410 A | * | 8/1994 | Tsujiuchi et al. ........... | 382/284 |
| 5,960,379 A | * | 9/1999 | Shimizu et al. ............. | 356/511 |

FOREIGN PATENT DOCUMENTS

| | | |
|---|---|---|
| JP | 02-259509 | 10/1990 |
| JP | 05-240626 | 9/1993 |
| JP | 10-281737 | 10/1998 |

* cited by examiner

*Primary Examiner*—Gregory J. Toatley, Jr.
*Assistant Examiner*—Patrick Connolly
(74) *Attorney, Agent, or Firm*—Snider & Associates; Ronald R. Snider

(57) ABSTRACT

Respective regional form information items obtained from regional interference fringe images corresponding to partial regions of a spherical surface to be inspected are transformed into regional synthesis form information items corresponding to a common coordinate system set for aperture synthesis by using a relationship among a polar coordinate system of the spherical surface, a plane coordinate system of an imaging plane, and the common coordinate system. Thus obtained regional synthesis form information items are subjected to aperture synthesis processing, so as to determine the overall form information of the spherical surface.

6 Claims, 3 Drawing Sheets

SPHERICAL FORM MEASURING AND ANALYZING METHOD

RELATED APPLICATIONS

This application claims the priority of Japanese Patent Application No. 2002-093772 filed on Mar. 29, 2002, which is incorporated herein by reference.

BACKGROUND OF THE INVENTION

1. Field of the Invention

The present invention relates to a spherical form measuring and analyzing method using an interferometer apparatus; and, more specifically, to a spherical form measuring and analyzing method which determines overall form information of a surface to be inspected brighter than a reference lens for spherical surface measurement by combining respective form information items of individual partial regions of the surface to be inspected.

2. Description of the Prior Art

A reference lens is used when measuring the overall form of a surface to be inspected such as a spherical lens or a reflecting mirror by an interferometer apparatus. When the surface to be inspected is brighter (specifically represented by a greater numerical aperture, a smaller F value, or a greater aperture size) than the reference lens, it is theoretically impossible to measure the whole region of the surface at once. Therefore, a technique known as aperture synthesis has been in use.

In general, aperture synthesis has been known as a technique in which the whole region of an object having a large area is divided into partial regions, each partial region is measured while adjacent partial regions overlap each other, and thus measured respective form information items of the individual partial regions are put together according to the form information concerning the regions measured in an overlapping manner, so as to determine form information of the whole region of the object.

In measurement and analysis using an interferometer apparatus, such aperture synthesis processing is relatively easy to apply to a flat object, but hard to apply to a spherical object due to its spherical surface.

When measuring a spherical surface to be inspected which is brighter than a reference lens by using an interferometer apparatus, a regional interference fringe image corresponding to a partial region of the spherical surface is captured each time the spherical surface is relatively moved with respect to the reference lens by a predetermined amount. In each regional interference fringe image, information of a three-dimensional space, i.e., a spherical surface to be inspected having a predetermined curvature, is transformed into information of a two-dimensional space, i.e., an imaging plane of CCD or the like. Each regional interference fringe image is also an image whose center position corresponds to the center position of the imaging plane. Therefore, even when parts of the respective regional form information items obtained from the regional interference fringe images are known to belong to the same region, these regional form information items cannot simply be put together in a plane coordinate system of the imaging plane.

Though literatures Japanese Unexamined Patent Publication Nos. HEI 2-259509 and HEI 10-281737, etc.) disclosing such aperture synthesis of spherical surfaces have conventionally been known, none of them has specifically described how the respective regional form information items obtained from captured regional interference fringe images can be put together.

SUMMARY OF THE INVENTION

In view of such circumstances, it is an object of the present invention to provide a spherical surface form measuring and analyzing method which can reliably put together respective regional form information items obtained from regional interference fringe images captured when measuring and analyzing the form of a surface to be inspected brighter than a reference lens for spherical surface measurement by using an interferometer apparatus.

For achieving the above-mentioned object, the present invention provides a spherical form measuring and analyzing method for measuring a form of a spherical surface to be inspected brighter than a reference lens for spherical surface measurement of an interferometer apparatus by using the interferometer apparatus, the method comprising the steps of capturing on an imaging plane a plurality of regional interference fringe images corresponding to a partial region of the spherical surface each time the spherical surface is relatively moved with respect to the reference lens by a predetermined amount; by using a relationship among a polar coordinate system of the spherical surface, a planar coordinate system of the imaging plane, and a common coordinate system set so as to be commonly used for a plurality of planar coordinate systems for aperture synthesis, transforming a regional form information item obtained from each of the captured regional interference fringe images into a regional synthesis form information item corresponding to the common coordinate system; and subjecting the regional synthesis form information to aperture synthesis processing so as to determine overall form information of the spherical surface.

Here, word "brighter" is used for meaning that the numerical aperture is greater, F value is smaller, or aperture size is greater.

In the method in accordance with the present invention, the regional interference fringe image may be captured while rotating the spherical surface about an optical axis of the spherical surface with respect to a predetermined rotation reference position by using a rotary support mechanism for rotating the spherical surface about the optical axis of the spherical surface in a state where the optical axis of the spherical surface and an optical axis of the reference lens obliquely intersect with each other, whereas the relationship among the three coordinate systems may be determined by using a first index indicative of a brightness of the reference lens, a second index indicative of an incident luminous flux diameter of the reference lens, a third index indicative of a brightness of the spherical surface, a fourth index indicative of an incident luminous flux diameter of the spherical surface, a fifth index indicative of an intersection angle of the two optical axes, and a sixth index indicative of a rotational angle of the spherical surface from the rotation reference position. The obliquely intersecting state mentioned above refers to a state where the optical axis of the spherical surface and the optical axis of the reference lens intersect with each other while having an inclination with respect to each other and forming a predetermined angle therebetween.

The above-mentioned "intersection angle" refers to an angle formed between the optical axis of the spherical surface and the optical axis of the reference lens.

In the present invention, the rotary support mechanism may be adapted to adjust the intersection angle, the intersection angle adjusted by the rotary support mechanism may be determined, and thus determined intersection angle may be used as the fifth index.

The intersection angle may be determined by using a seventh index indicative of a distance between respective optical axis center positions of the reference lens and spherical surface in the plane coordinate system, the first index, and the second index.

Form information of the reference lens may be determined beforehand and used for correcting the overall form information.

When transforming the regional form information item into the regional synthesis form information item, a predetermined interpolation method may be used for rearranging a pixel position.

DESCRIPTION OF THE PREFERRED EMBODIMENTS

In the following, an embodiment of the present invention will be explained with reference to the drawings.

Figure 1:
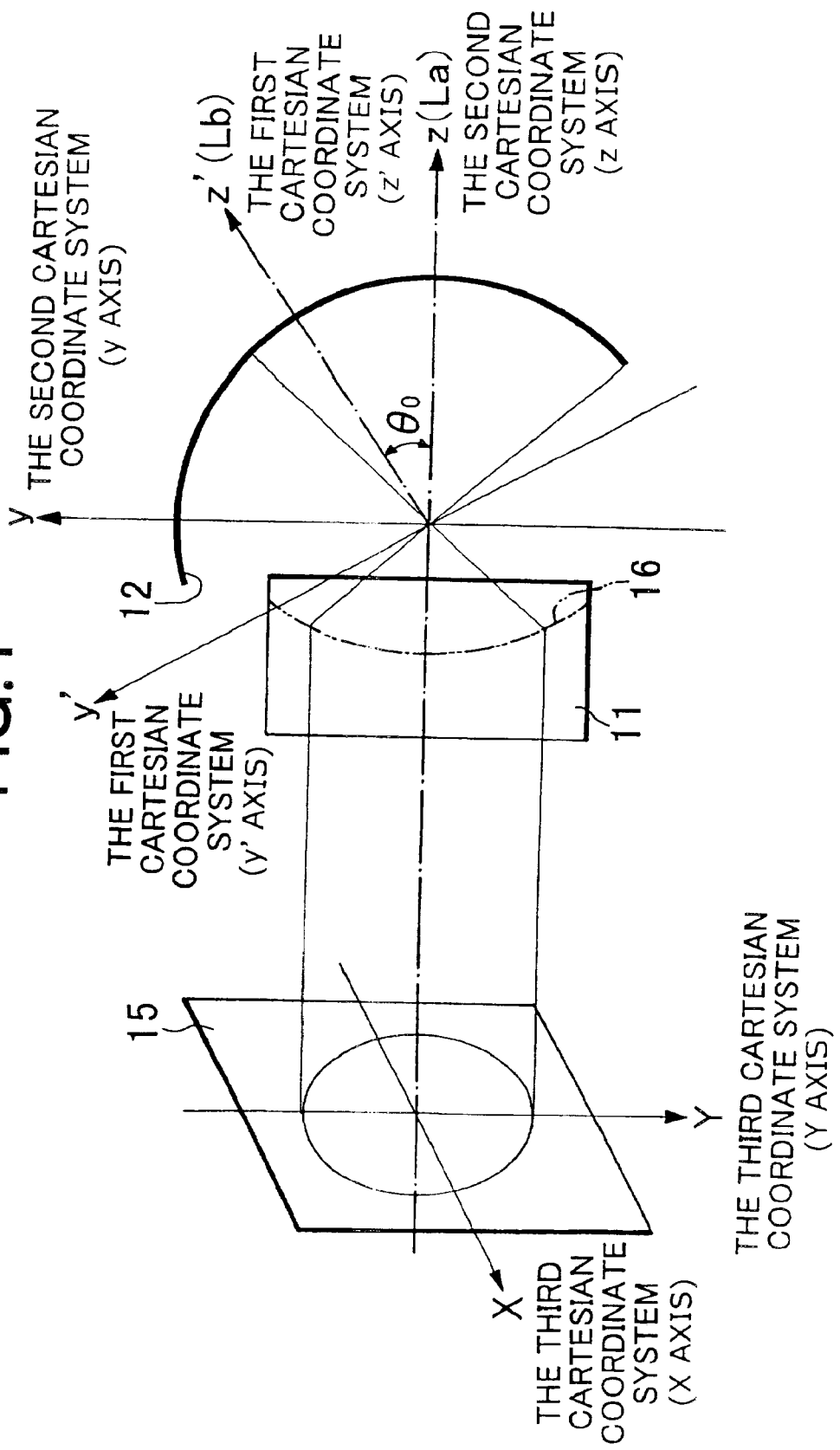
FIG. 1 is a schematic view for explaining the spherical surface measuring and analyzing method in accordance with an embodiment of the present invention.
Figure 2:
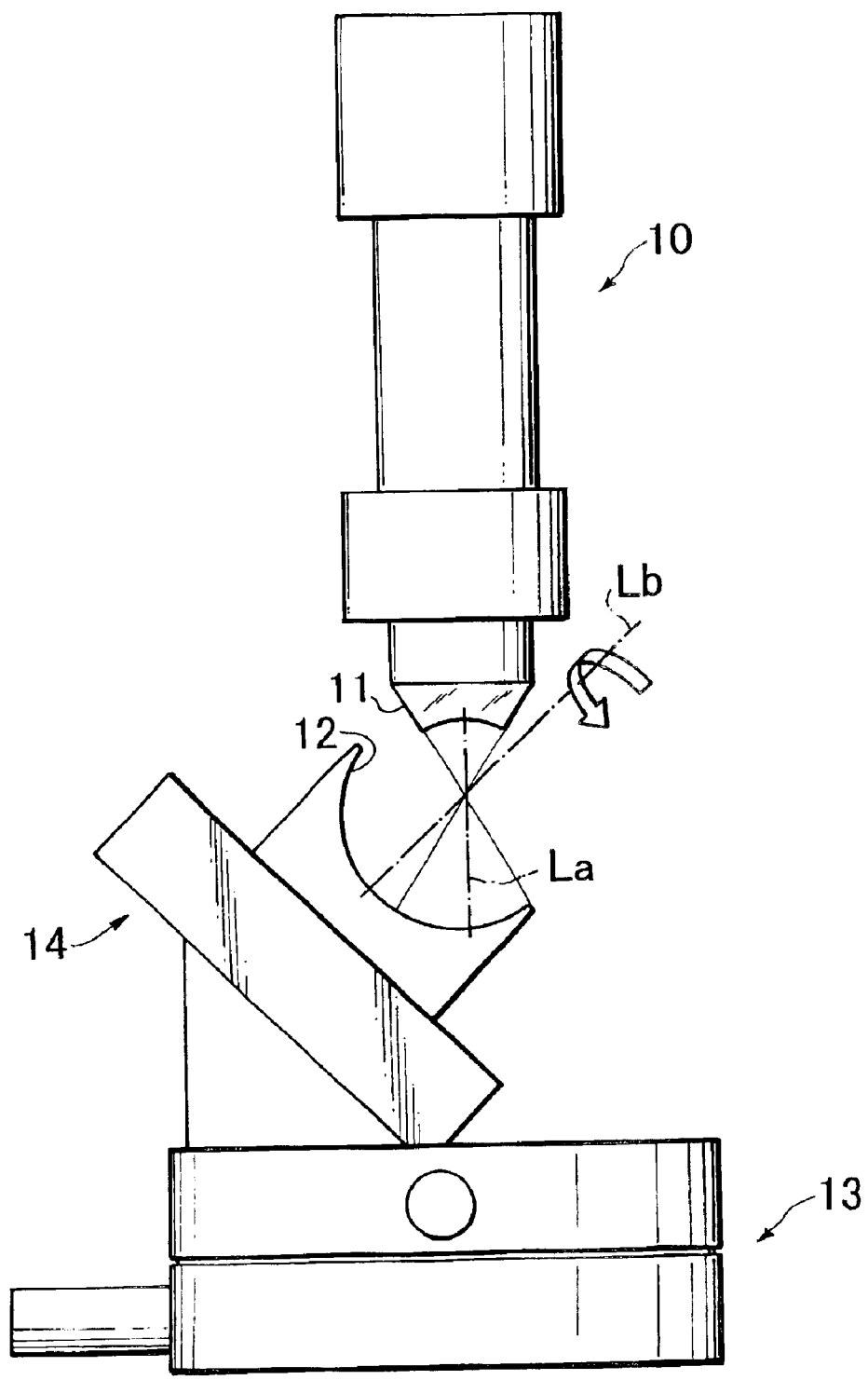
FIG. 2 is a schematic view showing an apparatus for carrying out the spherical surface measuring and analyzing method in accordance with the above-mentioned embodiment.

FIG. 1 is a schematic view for explaining the spherical surface measuring and analyzing method in accordance with an embodiment of the present invention, whereas FIG. 2 is a schematic view showing an apparatus for carrying out this spherical surface measuring and analyzing method.

In the spherical surface measuring and analyzing method in accordance with this embodiment, a Fizeau type interferometer apparatus 10 shown in FIG. 2 is used for measuring and analyzing the form of a spherical surface 12 to be inspected which is brighter than a reference lens 11 for spherical surface measurement. The interferometer apparatus 10 used in the method of this embodiment comprises not only the reference lens 11 but also a laser light source for outputting a luminous flux at a predetermined wavelength and a video camera or the like having a CCD as an image pickup device (which are not depicted), and are configured such that interference fringes can be measured and analyzed by fringe scanning.

The spherical surface 12 is held by a rotary support means 14 mounted on a triaxial adjusting mechanism 13. The rotary support means 14 comprises an inclination adjusting means, holds the spherical surface 12 by using the inclination adjusting means in a state where the optical axis La of the reference lens 11 and the optical axis Lb of the spherical surface 12 obliquely intersect with each other, i.e., in a state where the two optical axes La and Lb intersect with each other while forming a predetermined angle therebetween, and rotates thus held spherical surface 12 about the optical axis Lb. The inclination adjusting mechanism of the rotary support means 14 makes it possible to read out from its scale the intersection angle between the two optical axes La and Lb.

FIG. 1 shows the positional relationship between the reference lens 11 and the spherical surface 12, and three Cartesian coordinate systems. As shown in FIG. 1, the reference lens 11 (whose virtual principal spherical surface is indicated by a virtual line 16 in FIG. 1) and the spherical surface 12 are disposed such that the focal point of the reference lens 11 and the center of curvature of the spherical surface 12 align with each other. The first Cartesian coordinate system (x', y', z') is a spatial coordinate system fixed to the spherical surface 12, and is set such that its origin coincides with the center of curvature of the spherical surface 12 whereas its z' axis extends along the optical axis Lb of the spherical surface 12. The second Cartesian coordinate system (x, y, z) is a spatial coordinate system fixed to the reference lens 11 (interferometer apparatus 10), and is set such that its origin coincides with the focal point of the reference lens 11 whereas its z axis extends along the optical axis La of the reference lens 11. The third Cartesian coordinate system (X, Y) is a plane coordinate system fixed to an imaging plane constituted by the imaging surface of the CCD, and is set such that its origin coincides with the center of an image aperture projected onto the imaging plane 15. Both of the x' axis of the first Cartesian coordinate system and the x axis of the second Cartesian coordinate system extend from the front side to rear side of the drawing sheet in FIG. 1 and neither the x' axis nor the x axis is depicted.

In addition to the above-mentioned three Cartesian coordinate systems, three coordinate systems are set in the method in accordance with this embodiment. The first one is a three-dimensional polar coordinate system (R, $\theta'$, $\phi'$) fixed to the spherical surface 12. Here, R is the radius of curvature of the spherical surface 12, $\theta'$ is the zenith angle formed with the z' axis of the first Cartesian coordinate system, and $\phi'$ is the direction angle formed with the x' axis of the first Cartesian coordinate system. The second one is a three-dimensional polar coordinate system (R, $\theta$, $\phi$) fixed to the reference lens 11 (interferometer apparatus 10). Here, R is the radius of curvature of the spherical surface 12, $\theta$ is the zenith angle formed with the z axis of the second Cartesian coordinate system, and $\phi$ is the direction angle formed with the x axis of the second Cartesian coordinate system. The third one is a common coordinate system (X', Y') for aperture synthesis constituted by a two-dimensional Cartesian coordinate system set such that its origin coincides with the aperture center of the image projected onto the imaging plane 15 when the spherical surface 12 is at its initial state, i.e., the axes of the first Cartesian coordinate system (x', y', z') fixed to the spherical surface 12 and their corresponding axes of the second Cartesian coordinate system (x, y, z) fixed to the reference lens 11 coincide with each other.

Relationship Among Coordinate Systems

The relationship among the above-mentioned coordinate systems will now be explained. First, six indexes used for determining the relationship among the coordinate systems will be explained. The first index F is the F value indicating the brightness of the reference lens 11, whereas the second index D is the incident luminous flux diameter (projection aperture size in the third Cartesian coordinate system (X, Y)) of the reference lens 11. The third index F' is the F value indicating the brightness of the spherical surface 12, whereas the fourth index D' is the incident luminous flux diameter of the spherical surface 12 (projection aperture size of the spherical surface 12 in the common coordinate system (X', Y') when the spherical surface 12 in the initial state (where $\theta_0=0$) is assumed to be observed with a virtual reference lens brighter than the spherical surface 12). The fifth index $\theta_0$ is the intersection angle formed between the optical axis La of the reference lens 11 and the optical axis Lb of the spherical surface 12, whereas the sixth index $\phi_0$ is the rotational angle of the spherical surface 12 about the z' axis from the rotation reference position (first measuring and analyzing position) of the spherical surface 12.

Using the six indexes, the relationship among the polar coordinate system (R, θ', φ') of the spherical surface 12, the plane coordinate system of the imaging plane 15 (the third Cartesian coordinate system (X, Y)), and the common coordinate system (X', Y') set for aperture synthesis is determined according to the following procedure.

The relationship between the first Cartesian coordinate system (x', y', z') and polar coordinate system (R, θ', φ') fixed to the spherical surface 12 is represented by the following set of expressions (1):

$$x'=R \sin \theta' \cos \phi'$$
$$y'=R \sin \theta' \sin \phi' \quad (1)$$
$$z'=R \cos \theta'$$

Suppose a case where the optical axis Lb (z' axis) of the spherical surface 12 and the optical axis La (z axis) of the reference lens 11 obliquely intersect with each other with an intersection angle of the fifth index $\theta_0$, whereas the spherical surface 12 is rotated by the sixth index $\phi_0$ about the optical axis Lb of the spherical surface 12 with respect to the rotation reference position (initial measuring and analyzing position). When the spherical surface 12 in the state where the axes of the first Cartesian coordinate system (x', y', z') and their corresponding axes of the second Cartesian coordinate system (x, y, z) coincide with each other is rotated by $\phi_0$ about the x' axis from the z' axis toward the y' axis and then by $\theta_0$ about the rotated z' axis from the x' axis toward the y' axis, the relationship between the first Cartesian coordinate system (x', y', z') fixed to the spherical surface 12 and the second Cartesian coordinate system (x, y, z) fixed to the reference lens 11 can be represented by the following expression (2):

$$\begin{bmatrix} x \\ y \\ z \end{bmatrix} = \begin{bmatrix} 1 & 0 & 0 \\ 0 & C & S \\ 0 & -S & C \end{bmatrix} \begin{bmatrix} C' & -S' & 0 \\ S' & C' & 0 \\ 0 & 0 & 1 \end{bmatrix} \begin{bmatrix} x' \\ y' \\ z' \end{bmatrix} \quad (2)$$

$$= \begin{bmatrix} C' & -S' & 0 \\ CS' & CC' & S \\ -SS' & -SC' & C \end{bmatrix} \begin{bmatrix} x' \\ y' \\ z' \end{bmatrix}$$

where C=cos $\theta_0$, S=sin $\theta_0$, C'=cos $\phi_0$, and S'=sin $\phi_0$.

The relationship between the first Cartesian coordinate system (x', y', z') fixed to the spherical surface 12 and the polar coordinate system (R, θ, φ) fixed to the reference lens 11 will now be explained.

From the relationship between the second Cartesian coordinate system (x, y, z) and polar coordinate system (R, θ, φ) fixed to the reference lens 11, the following expression (3) holds:

$$z=R \cos \theta \quad (3)$$

When z in the above-mentioned expression (3) is represented by the first Cartesian coordinate system (x', y', z'), the following expression (4) is obtained from the above-mentioned expression (2), thus yielding the following expression (5):

$$z=-SS'x'-SC'y'+Cz' \quad (4)$$
$$\theta=\cos^{-1}[(-SS'x'-SC'y'+Cz')/R] \quad (5)$$

When the above-mentioned expression (2) is inputted to the following expression (6), the following expression (7) is obtained:

$$\tan \phi=y/x \quad (6)$$
$$\tan \phi=(CS'x'+CC'y'+Sz')/(C'x'-S'y') \quad (7)$$

Hence, the following expression (8) is obtained:

$$\phi=\tan^{-1}[(CS'x'+CC'y'+Sz')/(C'x'-S'y')] \quad (8)$$

The above-mentioned expressions (5) and (8) can represent the relationship between the polar coordinate system (R, θ, φ) fixed to the reference lens 11 and the first Cartesian coordinate system (x', y', z') fixed to the spherical surface 12.

Letting r be the distance from the origin and f be the focal length of the reference lens 11 in the plane coordinate system (X, Y) of the imaging plane 15, the following expression (9) holds:

$$r=f \sin \theta \quad (9)$$

When the first index F, which is the F value of the reference lens 11, and the second index D, which is the incident luminous flux diameter of the reference lens 11 in the plane coordinate system (X, Y), are used, the following expression (10) holds, thereby yielding the relationship of the following expression (11):

$$f=\overline{FD} \quad (10)$$
$$r=\overline{FD} \sin \theta \quad (11)$$

Since the following set of expressions (12) is obtained from the relationship between the plane coordinate system (X, Y) and the polar coordinate system (R, θ, φ) of the reference lens 11, the following set of expressions (13) is yielded when the above-mentioned expression (11) is inputted to the following set of expressions (12):

$$X=r \cos \phi, Y=r \sin \phi \quad (12)$$
$$X=\overline{FD} \sin \theta \cos \phi, Y=\overline{FD} \sin \theta \sin \phi \quad (13)$$

When the above-mentioned expressions (5) and (8) are inputted to the above-mentioned expression (13), the relationship between the plane coordinate system (X, Y) of the imaging plane 15 and the polar coordinate system (R, θ', φ') of the spherical surface 12 can be represented by using the first index F, second index D, fifth index $\theta_0$, and sixth index $\phi_0$.

The relationship between the plane coordinate system (X, Y) of the imaging plane 15 and the common coordinate system (X', Y') will now be determined. Using the third index F', which is the F value of the spherical surface 12, and the fourth index D', which is the incident luminous flux diameter of the spherical surface 12 in the common coordinate system (X', Y'), the following set of expressions (14) is obtained from the above-mentioned set of expressions (13):

$$X'=\overline{F'D'} \sin \theta' \cos \phi', Y'=\overline{F'D'} \sin \theta' \sin \phi' \quad (14)$$

From the above-mentioned set of expressions (14), the following expression (15) holds. Hence, from the above-mentioned expression (1), the relationship between the first Cartesian coordinate system (x', y', z') of the spherical surface 12 and the common coordinate system (X', Y') can be represented by the following set of expressions (16):

$$\sqrt{x'^2 + Y'^2} = \overline{F'D'} \sin \theta' \qquad (15)$$

$$\left.\begin{array}{l} x' = RX'/\overline{F'D'} \\ y' = RY'/\overline{F'D'} \\ z' = R\cos[\sin^{-1}(\sqrt{x'^2 + Y'^2}/\overline{F'D'})] \end{array}\right\} \qquad (16)$$

When the above-mentioned set of expressions (16), i.e., the first Cartesian coordinate system (x', y', z') represented by the common coordinate system (X', Y'), is inputted to the above-mentioned expressions (5) and (8), the following expressions (17) and (19) are obtained, whereby the following expressions (18) and (20) are respectively determined at last:

$$\cos\theta = -\sin\theta_0\sin\phi_0 X'/\overline{F'D'} - \sin\theta_0\cos\phi_0 Y'/\overline{F'D'} + \cos\theta_0\cos[\sin^{-1}(\sqrt{X'^2+Y'^2}/\overline{F'D'})] \qquad (17)$$

$$\theta = \cos^{-1}\{-\sin\theta_0\sin\phi_0 X'/\overline{F'D'} - \sin\theta_0\cos\phi_0 Y'/\overline{F'D'} + \cos\theta_0\cos[\sin^{-1}(\sqrt{X'^2+Y'^2}/\overline{F'D'})]\} \qquad (18)$$

$$\tan\phi = \{\cos\theta_0\sin\phi_0 X'/\overline{F'D'} + \cos\theta_0\cos\phi_0 Y'/\overline{F'D'} + \sin\theta_0\cos[\sin^{-1}(\sqrt{X'^2+Y'^2}/\overline{F'D'})]\}/ (\cos\phi_0 X'/\overline{F'D'} - \sin\phi_0 Y'/\overline{F'D'}) \qquad (19)$$

$$\phi = \tan^{-1}(\{\cos\theta_0\sin\phi_0 X'/\overline{F'D'} + \cos\theta_0\cos\phi_0 Y'/\overline{F'D'} + \sin\theta_0\cos[\sin^{-1}(\sqrt{X'^2+Y'^2}/\overline{F'D'})]\}/ (\cos\phi_0 X'/\overline{F'D'} - \sin\phi_0 Y'/\overline{F'D'})) \qquad (20)$$

When the results of the above-mentioned expressions (18) and (19) determined here are inputted to the above-mentioned set of expressions (13), the relationship between the plane coordinate system (X, Y) of the imaging plane 15 and the common coordinate system (X', Y') can be determined.

Explained in the following is a procedure of measurement and analysis in the method of this embodiment in which aperture synthesis processing is carried out by using the relationship among the coordinate systems determined as mentioned above.

Procedure of Measurement and Analysis (1) The spherical surface 12 to be inspected is held by the rotary support means 14 such that the optical axis Lb of the spherical surface 12 and the optical axis La of the reference lens 11 obliquely intersect with each other, and the triaxial adjusting means 13 is regulated so as to generate interference fringes. Here, the intersection angle $\theta_0$ formed between the optical axis Lb of the spherical surface 12 and the optical axis La of the reference lens 11 is set in view of the scale of the inclination adjusting mechanism provided in the rotary support means 14. The angle at which $\theta_0$ is to be set is determined beforehand by calculation such that the whole region of the spherical surface 12 can be measured.

(2) In the state set by (1), fringe scanning measurement is carried out, so as to capture a regional interference fringe image corresponding to a predetermined partial region of the spherical surface 12.

(3) The rotary support means 14 is caused to rotate the spherical surface 12 about its optical axis Lb by an angle $\phi_0$. This rotational angle $\phi_0$ is also determined beforehand such that the whole region of the spherical surface 12 can be measured by a predetermined number of image-capturing operations.

(4) The triaxial adjusting means 13 is regulated so as to generate interference fringes.

(5) The second fringe scanning measurement is carried out, so as to capture a second regional interference fringe image corresponding to a second partial region of the spherical surface 12.

(6) The rotary support means 14 is further rotated about the optical axis La by the angle $\phi_0$.

(7) The foregoing steps (4) to (6) are repeated until the whole region of the spherical surface 12 is measured.

(8) Respective regional form information items are obtained from the captured regional interference fringe images, and thus obtained regional form information items are subjected to the method of least squares, so as to eliminate the inclination power component concerning inclination errors and errors dependent on the focus position.

(9) The regional form information items in the plane coordinate system (X, Y) of the imaging plane 15 are transformed into respective regional synthesis form information items corresponding to the above-mentioned common coordinate system (X', Y') by using the above-mentioned relationship among the coordinate systems.

(10) In the common coordinate system (X' Y'), aperture synthesis processing for putting together regionally overlapping parts of the regional synthesis form information items by the method of least squares is carried out, whereby the overall form information of the spherical surface 12 is determined.

(11) From thus obtained overall form information after aperture synthesis, the inclination power component is eliminated by the method of least squares.

Figure 3:
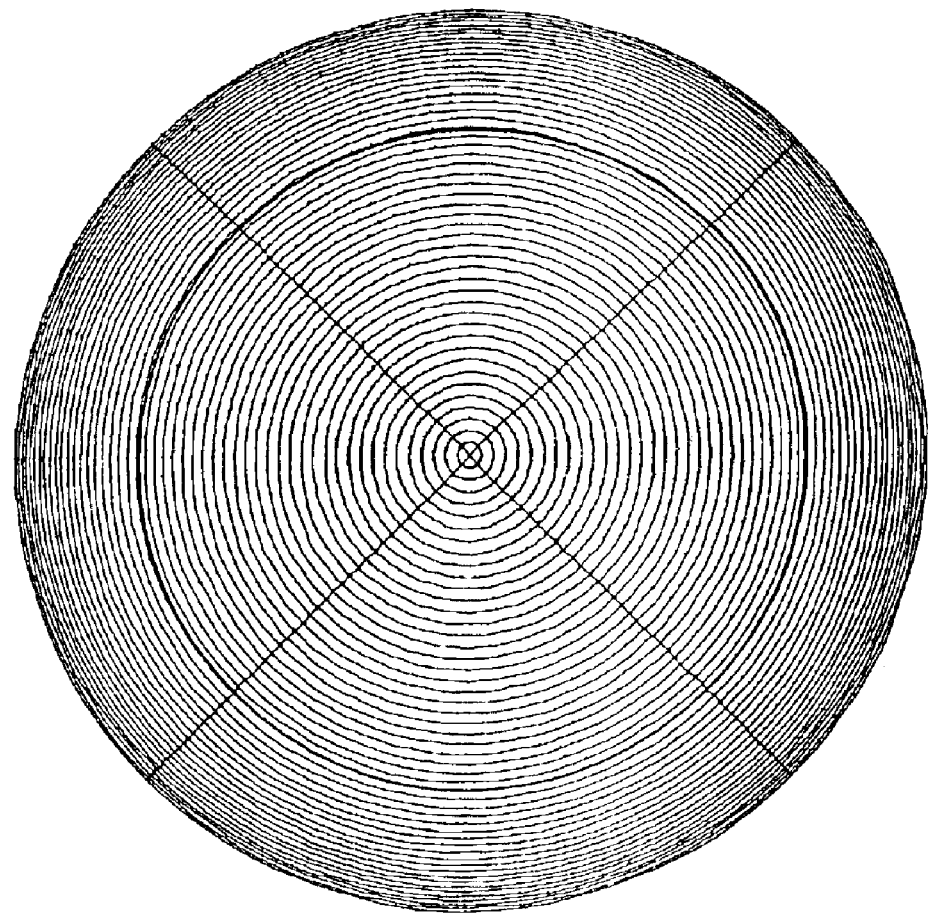
FIG. 3 is a view showing an example of results of measurement and analysis of a spherical surface to be inspected.

FIG. 3 shows an example of output image concerning the overall form information of the spherical surface 12 determined by such a procedure of measurement and analysis. The spherical surface 12 employed has a numerical aperture of 0.9715, whereas the circle depicted with a thick line in the drawing indicates a region having an F value of 0.7. The radial lines in the drawing indicate lines perpendicularly intersecting with each other at the optical axis center of the spherical surface 12.

When transforming the regional form information items in the plane coordinate system (X, Y) into the respective regional synthesis form information items corresponding to the common coordinate system (X', Y'), interpolation processing for rearranging pixel positions is carried out. For example, assuming the pixel matrix of the plane coordinate system (X, Y) to have an integral value of 512×512, and that of the common coordinate system (X', Y') to have an integral value of 1024×1024, the interpolation method is carried out as follows.

For determining a form information item $F'(X'_1, Y'_1)$ at predetermined coordinates $(X'_1, Y'_1)$ in the common coordinate system (X', Y'), the coordinates $(X'_1, Y'_1)$ are inversely transformed, whereby their corresponding coordinates $(X_{1f}, Y_{1f})$ in the plane coordinate system (X, Y) are determined. Since $X_{1f}$ and $Y_{1f}$ are not integers here, their decimal fractions are cut off, whereby their remaining integers are taken as coordinates $(X_{1i}, Y_{1i})$. Letting $F(X_{1i}, Y_{1i})$ be the form information item corresponding to the coordinates $(X_{1i}, Y_{1i})$, $F(X_{1i}+1, Y_{1i})$, $F(X_{1i}, Y_{1i}+1)$, and $F(X_{1i}+1, Y_{1i}+1)$ are obtained with reference thereto, and it is seen that $F(X_{1f}, Y_{1f})$ exists within an area surrounded by the three coordinate points mentioned above and $F(X_{1i}, Y_{1i})$. Therefore, when interpolation processing is carried out by using $F(X_{1i}+1, Y_{1i})$, $F(X_{1i}, Y_{1i}+1)$, and $F(X_{1i}+1, Y_{1i}+1)$, $F(X_{1i}, Y_{1i})$ is determined. Thus determined $F(X_{1i}, Y_{1i})$ becomes $F'(X'_1, Y'_1)$.

Alternatively, the form of the reference lens 11 may be determined beforehand, so as to use the form information of the reference lens 11 for correcting the overall form information of the spherical surface 12. As a method of determining the form of the reference lens 11, for example, a three-surface-aligning method such as one disclosed in Japanese Unexamined Patent Publication No. HEI 5-240626 can be applied to spherical lenses.

In the above-mentioned procedure of measurement and analysis, the intersection angle $\theta_0$ between the optical axis Lb of the spherical surface 12 and the optical axis La of the reference lens 11 is determined from the scale provided in the rotary support means 14. However, in the case where the optical axis center position of the spherical surface 12 is included in each regional interference fringe image together with the optical axis center position of the reference lens 11, the intersection angle $\theta_0$ may be determined by the following procedure of calculation by using a seventh index $r_0$ indicative of the distance between the optical axis center position of the reference lens 11 and the optical axis center position of the spherical surface 12 in the plane coordinate system (X, Y), the first index F, which is the F value of the reference lens 11, and the second index D indicative of the incident luminous flux diameter of the reference lens 11 in the plane coordinate system (X, Y).

Namely, since the relationship of the following expression (21) holds among the above-mentioned intersection angle $\theta_0$, seventh index $r_0$, first index F, and second index D, $\theta_0$ can be determined from the relationship of the following expression (22) when the distance $r_0$ between the optical axis center position of the reference lens 11 and the optical axis center position of the spherical surface 12 is known even if $\theta_0$ is unknown.

$$r_0 = f \sin \theta_0$$
$$= \overline{FD} \sin \theta_0 \qquad (21)$$
$$\theta_0 = \sin^{-1}(r_0/\overline{FD}) \qquad (22)$$

In the spherical surface form measuring and analyzing method in accordance with the present invention, as explained in detail in the foregoing, respective regional form information items obtained from regional interference fringe images corresponding to partial regions of a spherical surface to be inspected are transformed into regional synthesis form information items corresponding to a common coordinate system set for aperture synthesis by using a relationship among a polar coordinate system of the spherical surface, a plane coordinate system of an imaging plane, and the common coordinate system, and thus obtained regional synthesis form information items are subjected to aperture synthesis processing, so as to determine the overall form information of the spherical surface. Therefore, the regional form information items can be put together reliably, whereby the overall form of a spherical surface brighter than a reference lens can be determined with a high accuracy.

What is claimed is:

1. A spherical form measuring and analyzing method for measuring a form of a spherical surface to be inspected by using an interferometer apparatus with a reference lens for spherical surface measurement of said interferometer apparatus, said method comprising the steps of capturing on an imaging plane a plurality of regional interference fringe images corresponding to a partial region of said spherical surface each time said spherical surface is relatively moved with respect to said reference lens by a predetermined amount; by using a relationship among a polar coordinate system of said spherical surface, a planar coordinate system of said imaging plane, and a common coordinate system set so as to be commonly used for a plurality of planar coordinate systems for aperture synthesis, transforming a regional form information item obtained from each of said captured regional interference fringe images into a regional synthesis form information item corresponding to said common coordinate system; and subjecting said regional synthesis form information to aperture synthesis processing so as to determine overall form information of said spherical surface.

2. A spherical form measuring and analysing method according to claim 1, wherein said regional interference fringe image is captured while rotating said spherical surface about an optical axis of said spherical surface with respect to a predetermined rotation reference position by using a rotary support mechanism for rotating said spherical surface about said optical axis of said spherical surface in a state where said optical axis of said spherical surface and an optical axis of said reference lens obliquely intersect with each other; and wherein said relationship among said three coordinate systems is determined by using a first index indicative of a brightness of said reference lens, a second index indicative of an incident luminous flux diameter of said reference lens, a third index indicative of a brightness of said spherical surface, a fourth index indicative of an incident luminous flux diameter of said spherical surface, a fifth index indicative of an intersection angle of said two optical axes, and a sixth index indicative of a rotational angle of said spherical surface from said rotation reference position.

3. A spherical form measuring and analyzing method according to claim 2, wherein said rotary support mechanism is adapted to adjust said intersection angle, said intersection angle adjusted by said rotary support mechanism is determined, and said determined intersection angle is used as said fifth index.

4. A spherical form measuring and analyzing method according to claim 2, wherein said intersection angle is determined by using a seventh index indicative of a distance between respective optical axis center positions of said reference lens and spherical surface in said plane coordinate system, said first index, and said second index.

5. A spherical form measuring and analyzing method according to claim 1, wherein form information of said reference lens is determined beforehand and used for correcting said overall form information.

6. A spherical form measuring and analyzing method according to claim 1, wherein, when transforming said regional form information item into said regional synthesis form information item, a predetermined interpolation method is used for rearranging a pixel position.

* * * * *